US011551158B1

(12) United States Patent
Hinkins

(10) Patent No.: US 11,551,158 B1
(45) Date of Patent: Jan. 10, 2023

(54) PERSONALIZED DIGITAL TRAVEL ADVISOR SYSTEM AND METHOD OF USE

(71) Applicant: Ryan Don Hinkins, Sandy, UT (US)

(72) Inventor: Ryan Don Hinkins, Sandy, UT (US)

(*) Notice: Subject to any disclaimer, the term of this patent is extended or adjusted under 35 U.S.C. 154(b) by 75 days.

(21) Appl. No.: 16/666,770

(22) Filed: Oct. 29, 2019

Related U.S. Application Data

(63) Continuation-in-part of application No. 16/057,985, filed on Aug. 8, 2018, now abandoned.

(60) Provisional application No. 62/627,090, filed on Feb. 6, 2018.

(51) Int. Cl.
*G06Q 30/00* (2012.01)
*G06Q 10/02* (2012.01)
*G06N 20/00* (2019.01)

(52) U.S. Cl.
CPC ............ *G06Q 10/02* (2013.01); *G06N 20/00* (2019.01)

(58) Field of Classification Search
CPC ................... G06Q 30/0207–30/0277
USPC ............................. 705/14.1–14.73
See application file for complete search history.

(56) References Cited

U.S. PATENT DOCUMENTS

| | | | | |
|---|---|---|---|---|
| 6,034,688 | A * | 3/2000 | Greenwood | G06F 3/0485 715/784 |
| 6,810,527 | B1 * | 10/2004 | Conrad | H04N 21/6193 725/77 |
| 6,850,252 | B1 * | 2/2005 | Hoffberg | G06K 9/00369 348/E7.061 |
| 7,181,438 | B1 * | 2/2007 | Szabo | G06F 21/6245 |
| 9,139,091 | B1 * | 9/2015 | Penilla | G06F 21/45 |
| 9,189,900 | B1 * | 11/2015 | Penilla | G06Q 20/308 |
| 9,365,188 | B1 * | 6/2016 | Penilla | G06Q 30/0643 |
| 9,813,510 | B1 * | 11/2017 | Nickels | H04W 4/023 |
| 9,953,389 | B2 * | 4/2018 | Marco | G01C 21/3438 |
| 10,168,683 | B2 * | 1/2019 | Brew | G06F 40/216 |
| 10,482,559 | B2 * | 11/2019 | Djuric | G06Q 10/063112 |
| 10,872,322 | B2 * | 12/2020 | Siddique | G06T 19/00 |
| 2002/0152163 | A1 * | 10/2002 | Bezos | G07F 17/0014 705/40 |

(Continued)

FOREIGN PATENT DOCUMENTS

| | | | | | |
|---|---|---|---|---|---|
| JP | | 11103451 A | * | 4/1999 | ............ H04N 7/173 |
| JP | | 2004029937 A | * | 1/2004 | ............ G06F 17/60 |

OTHER PUBLICATIONS

• World Economic Forum. Digital Transformation Initiative Aviation, Travel and Tourism Industry. (Jan. 2017). Retrieved online Jun. 6, 2021. https://reports.weforum.org/digital-transformation/wp-content/blogs.dir/94/mp/files/pages/files/wef-dti-aviation-travel-and-tourism-white-paper.pdf (Year: 2017).*

(Continued)

*Primary Examiner* — James A Reagan
(74) *Attorney, Agent, or Firm* — Leavitt Eldredge Law Firm

(57) ABSTRACT

A personalized digital travel advisor system includes a computing device, a virtual travel advisor platform accessible via the computing device, a user profile integrated into the virtual travel advisor platform, a database, and a data analysis center. User data is collected and stored in the database to build a robust user profile based on a user's interests and preferences. The user data is analyzed by the data analysis center and one or more travel related recommendations are provided to the user based on the user profile.

8 Claims, 2 Drawing Sheets

(56) References Cited

U.S. PATENT DOCUMENTS

| | | | | |
|---|---|---|---|---|
| 2003/0046438 A1* | 3/2003 | O'Donnell | ............... | H04L 29/06 709/250 |
| 2003/0192052 A1* | 10/2003 | Frisco | .................... | G06Q 30/02 725/76 |
| 2008/0040474 A1* | 2/2008 | Zuckerberg | ............ | G06Q 30/02 709/224 |
| 2010/0138865 A1* | 6/2010 | Rai | ......................... | H04N 7/16 725/44 |
| 2010/0190510 A1* | 7/2010 | Maranhas | .............. | G06Q 10/02 455/456.1 |
| 2013/0238417 A1* | 9/2013 | Frelk, Jr. | ............ | G06Q 30/0207 705/14.36 |
| 2014/0297418 A1* | 10/2014 | Gaur | .................. | G06Q 30/0269 705/14.62 |
| 2016/0210602 A1* | 7/2016 | Siddique | .............. | G06Q 20/321 |
| 2016/0364678 A1* | 12/2016 | Cao | ......................... | G06Q 50/30 |
| 2016/0364679 A1* | 12/2016 | Cao | ......................... | G06Q 50/30 |
| 2016/0364812 A1* | 12/2016 | Cao | ......................... | G06Q 50/30 |
| 2016/0364823 A1* | 12/2016 | Cao | ......................... | G06Q 50/30 |
| 2019/0034976 A1* | 1/2019 | Hamedi | ............. | G06Q 30/0204 |
| 2019/0272602 A1* | 9/2019 | Ray | ........................ | G06F 16/285 |
| 2020/0363220 A1* | 11/2020 | Simoudis | ............ | G01C 21/3617 |
| 2021/0042708 A1* | 2/2021 | Gardiner | ................ | G06Q 30/02 |
| 2021/0224765 A1* | 7/2021 | Siddique | ................ | G06Q 10/10 |

OTHER PUBLICATIONS

• Mitul Makadia. How Hotels are Using AI to Provide an Awesome User Experience. (Feb. 1, 2018). Retrieved online Nov. 5, 2021. https://www.hotelspeak.com/2018/02/hotels-using-artificial-intelligence-provide-awesome-user-experience/ (Year: 2018).*
• Mckinsey Global Institute. "Artificial Intelligence the Next Digital Frontier?" (Jun. 2017). Retrieved online Sep. 24, 2022. (Year: 2017).*
Reference W (continued) https://www.mckinsey.com/~/media/mckinsey/industries/advanced%20electronics/our%20insights/how%20artificial%20intelligence%20can%20deliver%20real%20value%20to%20companies/mgi-artificial-intelligence-discussion-paper.pdf (Year: 2017).*

\* cited by examiner

PERSONALIZED DIGITAL TRAVEL ADVISOR SYSTEM AND METHOD OF USE

BACKGROUND

1. Field of the Invention

The present invention relates generally to travel related systems, and more specifically, to a personalized digital travel advisor system for assisting a traveler seamlessly throughout the end-to-end customer journey experience.

2. Description of Related Art

Within the travel industry there is a segmented disconnect between industry members responsible for a traveler's end-to-end experience. For example, airports and airlines often are not transparent and do not collaborate. This leads to each industry member having its own approach to handling a traveler's experience which consequently leads to each traveler having the same experience. This problem is demonstrated through the inflight entertainment where each airline passenger is given the same options for entertainment content and hardware.

Furthermore, airlines and ISPs struggle to maintain relationships and generate revenues from connectivity sales. There is immense pressure to provide "free" WiFi to airline passengers (the rate for passenger paid WiFi connectivity is only 6%), but ultimately someone within the supply chain will be required to pay for the connectivity and hardware solutions. Additionally, there is a struggle between members of the industry regarding who owns the passenger's data.

Consequently, the lack of digital literacy, lack of transparency and competitive ownership between travel partners and/or air travel representatives of customer data throughout the journey leads to poor experiences and limited choices particularly with inflight entertainment. This leads to every traveler having the same experience. Airlines and advertisers struggle to know how to value or measure inflight advertising space. Further, WiFi connectivity options that may be available in the future may require multiple resources and/or options rather than one connectivity option for everyone onboard an aircraft. These issues further limit the ability of airlines, airports, ISPs and other vendors to control passenger experiences.

Currently, travelers tend to value experience over cost. Travelers desire to have the expertise and assistance from someone knowledgeable in the travel industry when planning a trip. Travelers are interested in a unique and personalized experience when traveling. For the above-mentioned problems, industry partners are having a hard time customizing, personalizing, and tailoring experiences for individual travelers.

Accordingly, although great strides have been made in the area of travel related systems, many shortcomings remain.

DESCRIPTION OF THE DRAWINGS

The novel features believed characteristic of the embodiments of the present application are set forth in the appended claims. However, the embodiments themselves, as well as a preferred mode of use, and further objectives and advantages thereof, will best be understood by reference to the following detailed description when read in conjunction with the accompanying drawings, wherein:

Figure 1:
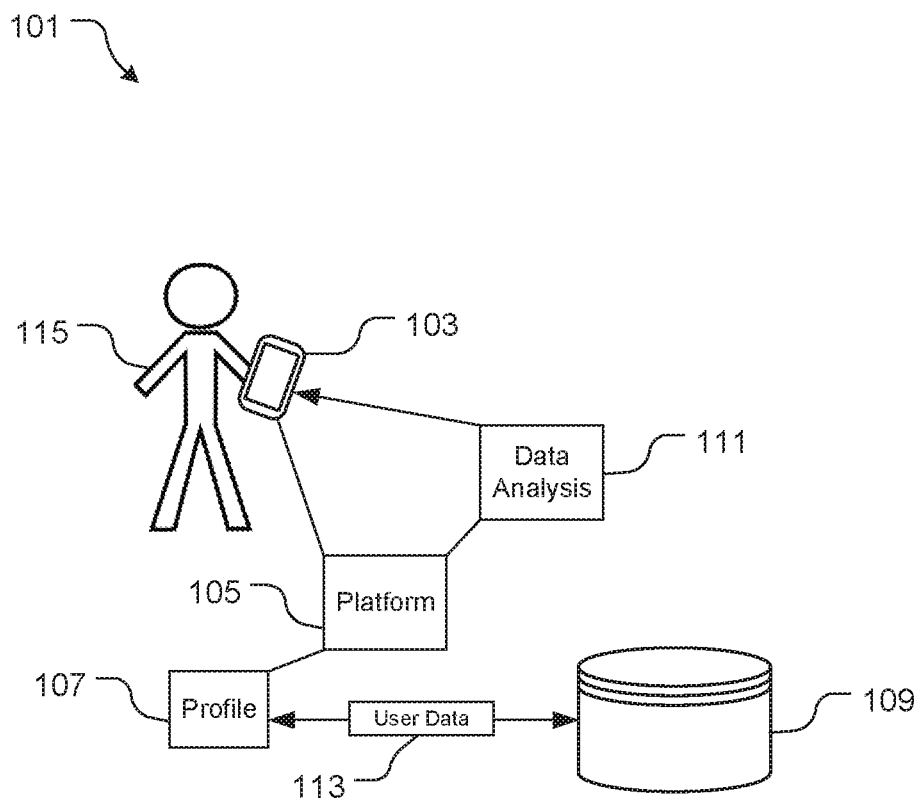
FIG. 1 is a simplified schematic of a personalized travel advisor system in accordance with a preferred embodiment of the present application.
Figure 2:
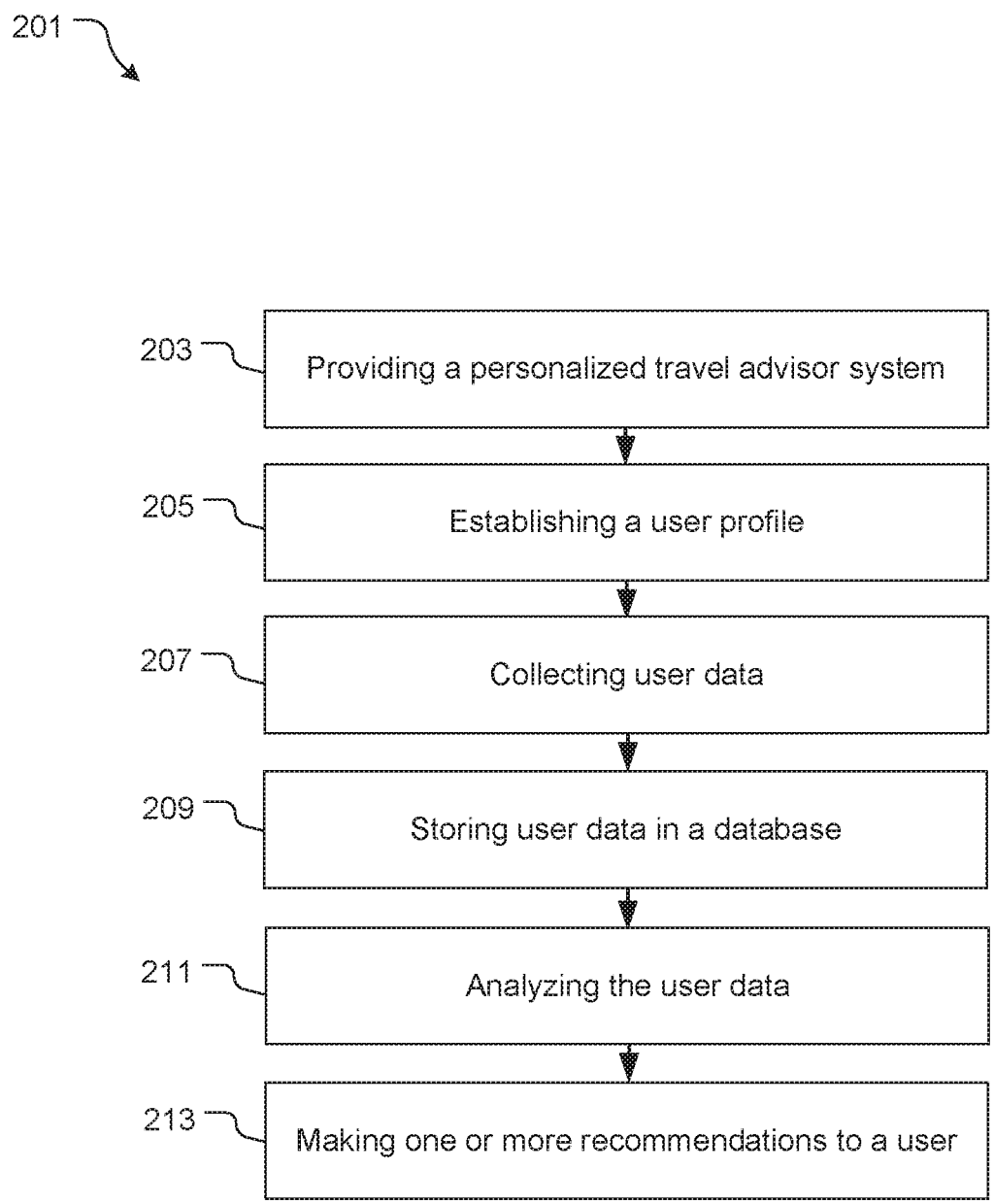
FIG. 2 is a flowchart of the method of use of the system of FIG. 1.

While the system and method of use of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the present application as defined by the appended claims.

DETAILED DESCRIPTION OF THE PREFERRED EMBODIMENT

Illustrative embodiments of the system and method of use of the present application are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The system and method of use in accordance with the present application overcomes one or more of the above-discussed problems commonly associated with conventional travel related systems. Specifically, through personalization and putting more control of the content into the hands of each individual traveler. These and other unique features of the system and method of use are discussed below and illustrated in the accompanying drawings.

The system and method of use will be understood, both as to its structure and operation, from the accompanying drawings, taken in conjunction with the accompanying description. Several embodiments of the system are presented herein. It should be understood that various components, parts, and features of the different embodiments may be combined together and/or interchanged with one another, all of which are within the scope of the present application, even though not all variations and particular embodiments are shown in the drawings. It should also be understood that the mixing and matching of features, elements, and/or functions between various embodiments is expressly contemplated herein so that one of ordinary skill in the art would appreciate from this disclosure that the features, elements, and/or functions of one embodiment may be incorporated into another embodiment as appropriate, unless described otherwise.

The preferred embodiment herein described is not intended to be exhaustive or to limit the invention to the precise form disclosed. It is chosen and described to explain the principles of the invention and its application and practical use to enable others skilled in the art to follow its teachings.

Referring now to the drawings wherein like reference characters identify corresponding or similar elements throughout the several views, FIG. 1 depicts a simplified schematic of a personalized travel advisor system in accordance with a preferred embodiment of the present application. It will be appreciated that system 101 overcomes one or more of the above-listed problems commonly associated with conventional travel related systems.

In the contemplated embodiment, system 101 includes a computing device 103, a virtual travel advisor platform 105, a user profile 107, a database, 109 and a data analysis center 111. The computing device 103 may be a personal mobile device or other similar computing device. The virtual travel advisor platform 105 is accessible to a user 115 via the computing device 103. The virtual travel advisor platform 105 may be accessible via WiFi or another wireless network or may be accessible without requiring a wireless network connection.

The user profile 107 is integrated into the virtual travel advisor platform 105. The user profile 107 collects user data 113 based on interests, preferences, and/or services used by the user 115. The user data 113 associated with the user profile 107 is stored in the database 109. The data analysis center 111 analyzes the user data 113 and provides customized and personalized travel recommendations and/or travel itineraries to the user 115. The system 101 may also include a means of displaying various advertisements to the user 115. Advertisements may include various types of advertisements including preference related advertisements specific to the user 115 as well as travel related advertisement or any other type of advertisement not specifically travel related.

System 101 may include various travel related services to facilitate and personalize the travel experience for the user 115. Such features may include step by step detailed planning from start to finish of a trip and notifications throughout a trip related to personalized recommendations based on the user profile 107. For example, notifications may include various forms of text notifications and/or voice notifications.

System 101 may operate via A.I. and machine learning to further enhance user experience and build a robust user profile 107. System 101 may comprise a reservation center and/or a payment center to allow the user 115 to make travel related reservations and travel related payments. For example, the user 115 may book a hotel, reserve a rental car, and/or select entertainment content, including inflight entertainment for those traveling via aircraft, and throughout travel journey or trip. Entertainment content provided by the system includes entertainment for non-flying situations as well as inflight entertainment for those traveling via aircraft. This may also include making reservations for private charters, business aircraft and the like. It should be appreciated that the use of A.I. to determine what is inspiring a user's journey is considered a novel feature of the system, such that the system provides specific recommendations based on the user profile 107.

It should be appreciated that as part of the travel planning, the system of the present application may allow travelers and passengers of aircraft to establish, set up and manage content, entertainment, inflight entertainment content and WiFi connectivity. This may be established prior to travel and flight, as well as, allowing for engagement through the entire travel journey. This creates a seamless and "always-on" experience allowing travelers to utilize all available options and ISPs. For example, travelers can finish content they start and control their experience allowing for true customization and personalization for a traveler. The inflight entertainment content may also include a virtual reality (VR) component for travelers to experience various choices for media content in VR. The VR component of the system may include a VR headset worn by the user 115 providing the user 115 with options to view and/or interact with the system. The VR component may include various forms of virtual reality content and experiences which may be part of the inflight entertainment content or other content offerings on the system. The system may integrate and/or interact with various forms of VR hardware and allow services to be viewed and/or interacted with through the VR hardware. These and other features are further applied to non-flying travelers including travelers staying at hotels, resorts, vacation rentals and the like. Content and services provided to travelers may include without limitation video and music streaming services and the like.

The user data 113 may be collected based on various predetermined criteria. For example, the user data 113 may be collected based on a series of in-depth questions about the user 115 such as the type of car the user drives, the user's age, the user's hobbies, etc. System 101 may prompt the user 115 to answer additional questions based on answers received. For example, if the user 115 expresses interest in sports, system 101 may follow up with additional questions regarding specific sport teams the user 115 has interest in. The user data 113 may also be collected from various integrated sources such as via social sites, etc. It should be appreciated that the system of the present application allows for ownership of the user data 113 to create a customized and personalized end-to-end unique experience for the user. The ability to own the customer data solves a current problem in the industry where the lack of transparency and cooperation between industry partners creates a segmentation as to who controls the customer data among various industry members.

The system of the present application may further include various advertising related features. For example, the system may allow for the ability to market and advertise to specific travelers and throughout the entire travel journey based on the user profile 107. Revenue generated from advertising may be useful to help offset certain costs for passengers such as WiFi or inflight connectivity. Additional features of the system may include location-based services to identify close by activities and timed events tailored specifically for the user 115 based on the user profile 107. Similarly, recommendations may be made to restaurants, attractions, and the like based on the current known position of the user 115, the time of day and the like. Social features may include allowing travelers to congregate, meet up, interact and/or plan trips together. Additionally, the system may include various tools such as mappings of airports, hotels, resorts and the like. It should be appreciated that these and other related features are considered unique and novel to the system of the present application.

It is contemplated that the system of the present application may be applicable to various travel industry members including without limitation airlines, airports, ISPs, hotels and resorts, among other travel related service providers. The system of the present application contemplates that a traveler may be able to seamlessly transition from one travel industry member to another. For example, a traveler may be able to start watching a movie during an airline flight and finish the movie after arriving at a hotel.

It should be appreciated that one of the unique features believed characteristic of the present application is the ability for a traveler to seamlessly connect to WiFi or other wireless networks and/or services while inflight as a traveler would on the ground without the need for complicated and time-consuming login procedures. This includes the ability to establish a WiFi connection before boarding a flight including payment and avoids the need for inflight payments.

The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A personalized, customizable, end to end digital travel advisor system, consisting of:
    a computing device configured to operate software and cloud-based technology;
    a virtual travel advisor platform accessible via the computing device, which provides assistance to a user, wherein the assistance is unique to, tailored to, and updated based on continuously updating information on the user, the virtual travel advisor platform being accessible from the computing device wirelessly through one or more wireless connections and without a wireless network connection;
    a user profile generated by the virtual travel advisor platform, the user profile updates and evolves automatically throughout the user's interaction with the virtual travel advisory platform;
    a database connected to and generated by the virtual travel advisor platform having thereon user data associated with the user profile, the user data including user interests, user preferences, and services used by the user, the database updating over time through machine learning based on continuous data collected about the user as the user continues to interact with the virtual travel advisor platform; and
    a data analysis center to analyze the user data and build and provide through the virtual travel advisor platform, one or more travel related recommendations to a user based on the user profile;
    a media center accessible from the virtual travel advisor platform, the media center providing seamless entertainment from the start of user travel to the end of user travel, the entertainment being selected based on the database;
    a reservation center configured to allow the user to make travel related reservations and pay for the travel related reservations; and
    a payment center configured to allow the user to make travel related payments, the travel related payment including at least one payment option for selected connectivity options;
    the one or more travel related recommendations including at least a travel itinerary specific for the user based on the user data, entertainment recommendations, and service recommendations;
    the virtual travel advisor platform receives, prior to a start of user travel, a user selection of connectivity for a plurality of connectivity options available to the user from the start of user travel to an end of user travel, the plurality of connectivity options consisting of in flight connectivity options and on the ground connectivity options, the user selection allowing for seamless entertainment for the user from the start of user travel to the end of user travel;
    the service recommendations including at least one location and time based recommendation, wherein the at least one location and time based recommendation is determined at least in part through the virtual travel platform and computing device determining a current position of the user and a current time;
    wherein the data analysis center utilizes machine learning to improve and change the one or more travel related recommendations over time;
    wherein the service recommendations are specific for travel, including hotel recommendations and rental car recommendations; and
    wherein the one or more travel related recommendations are tailored for a trip associated with the user and are based on the trip from start to finish.

2. The personalized digital travel advisor system of claim 1, wherein the virtual travel advisor platform operates via A.I. and machine learning, such that the user profile, database, and one or more travel recommendations are continuously improved and updated based on new data received.

3. The personalized digital travel advisor system of claim 1, wherein the media center has a virtual reality component.

4. A method for providing a personalized, customizable, end to end travel experience, the method comprising:
    providing a personalized digital travel advisor system having a computing device configured to operate software and cloud-based technology with a virtual travel advisor platform accessible via the computing device, the virtual travel advisor platform provides assistance to a user, wherein the assistance is unique to, tailored to, and updated based on continuously updating information on the user, the virtual travel advisor platform being accessible from the computing device wirelessly through one or more wireless connections and without a wireless network connection;
    establishing a user profile on the virtual travel advisor platform for the user, the user profile updating and evolving throughout the user's interaction with the virtual travel advisory platform;
    collecting user data of the user, the user data including user interests, user preferences, and services used by the user;
    receiving from the user, prior to a start of user travel, a user selection of connectivity for a plurality of connectivity options available to the user from the start of user travel to an end of user travel, the plurality of connectivity options consisting of in flight connectivity options and one or more on the ground connectivity options, the user selection allowing for seamless entertainment for the user from the start of user travel to the end of user travel;
    storing the user data in a database, wherein the database updates and evolves over time based on machine learning and continuous data collection from the user;
    analyzing the user data according to predetermined criteria via a data analysis center; and
    making one or more travel related recommendations to the user based on results generated from the user data analyzed;
    the one or more travel related recommendations including at least a travel itinerary specific for the user based on the user data, entertainment recommendations, and service recommendations;
    the service recommendations including at least one location and time based recommendation, wherein the at least one location and time based recommendation is determined at least in part through the virtual travel platform and computing device determining a current position of the user and a current time;

wherein the data analysis center utilizes machine learning to improve and change the one or more travel related recommendations over time;

wherein the service recommendations are specific for travel, including hotel recommendations and rental car recommendations; and wherein the one or more travel related recommendations are tailored for a trip associated with the user and are based on the trip from start to finish.

5. The method for providing a personalized travel experience of claim 4, further comprising displaying an advertisement to the user.

6. The method for providing a personalized travel experience of claim 4, further comprising allowing the user to make travel related reservations and pay for the travel related reservations.

7. The method for providing a personalized travel experience of claim 4, further comprising allowing the user to make travel related payments, the travel related payment including at least one payment option for selected connectivity option.

8. The method for providing a personalized travel experience of claim 4, wherein the virtual travel advisor platform operates via A. I. and machine learning.

\* \* \* \* \*